United States Patent
Kim et al.

(10) Patent No.: US 12,371,345 B2
(45) Date of Patent: Jul. 29, 2025

(54) CATHODE ACTIVE MATERIAL FOR LITHIUM SECONDARY BATTERY AND METHOD OF MANUFACTURING THE SAME

(71) Applicant: SK ON CO., LTD., Seoul (KR)

(72) Inventors: Jik Soo Kim, Daejeon (KR); Ji Hoon Choi, Daejeon (KR); Sang Bok Kim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 644 days.

(21) Appl. No.: 17/672,029

(22) Filed: Feb. 15, 2022

(65) Prior Publication Data

US 2022/0259065 A1   Aug. 18, 2022

(30) Foreign Application Priority Data

Feb. 16, 2021 (KR) .................. 10-2021-0020470

(51) Int. Cl.
C01G 53/44 (2025.01)
H01M 4/525 (2010.01)
H01M 10/0525 (2010.01)

(52) U.S. Cl.
CPC ............ C01G 53/44 (2013.01); H01M 4/525 (2013.01); H01M 10/0525 (2013.01); *C01P 2004/50* (2013.01); *C01P 2004/61* (2013.01)

(58) Field of Classification Search
CPC ....... H01M 4/525; C01G 53/42; C01G 53/50; C01P 2004/50; C01P 2004/61
See application file for complete search history.

(56) References Cited

U.S. PATENT DOCUMENTS 6,306,787 B1 * 10/2001 Sato ................. H01M 4/525
  423/594.3
2008/0268347 A1   10/2008 Ohzuku et al.

FOREIGN PATENT DOCUMENTS

| KR | 10-0821523 B1 | 4/2008 |
| KR | 10-2018-0063858 A | 6/2018 |
| WO | 2020/127526 A1 | 6/2020 |

OTHER PUBLICATIONS

Yue Chen et al., Insight into the intrinsic mechanism of improving electrochemical performance via constructing the preferred crystal orientation in lithium cobalt dioxide, Chemical Engineering Journal, 2020, vol. 399, Elsevier.
Extended European Search Report issued by the European Patent Office on Apr. 8, 2022.
Office Action for Korean Patent Application No. 10-2021-0020470 issued by the Korean Patent Office on Feb. 17, 2025.

* cited by examiner

*Primary Examiner* — Brittany L Raymond
(74) *Attorney, Agent, or Firm* — IP & T GROUP LLP

(57) ABSTRACT

The present invention provides a cathode active material for a secondary battery, which includes a lithium metal oxide particle having a form of a secondary particle in which a plurality of primary particles are agglomerated, wherein the primary particles comprise a particle having a triangular shape which has a size of a minimum internal angle of 45° or more and a maximum height of 0.5 μm or more.

7 Claims, 8 Drawing Sheets

CATHODE ACTIVE MATERIAL FOR LITHIUM SECONDARY BATTERY AND METHOD OF MANUFACTURING THE SAME

CROSS-REFERENCE TO RELATED APPLICATION AND CLAIM OF PRIORITY

This application claims priority to Korean Patent Application No. 10-2021-0020470 filed on Feb. 16, 2021 in the Korean Intellectual Property Office (KIPO), the entire disclosure of which is incorporated by reference herein.

BACKGROUND OF THE INVENTION

1. Field of the Invention

The present invention relates to a cathode active material for a lithium secondary battery and a method of manufacturing the same, and more particularly, to a cathode active material for a lithium secondary battery, which may include a lithium metal oxide, and a method of manufacturing the same.

2. Description of the Related Art

A secondary battery is a battery which can be repeatedly charged and discharged, and has been widely applied to portable electronic devices such as a mobile phone, a laptop computer, etc. as a power source thereof.

Examples of the secondary battery may include a lithium secondary battery, a nickel-cadmium battery, a nickel-hydrogen battery and the like. Among them, the lithium secondary battery has a high operating voltage and a high energy density per unit weight, and is advantageous in terms of a charging speed and light weight. In this regard, the lithium secondary battery has been actively developed and applied as a power source.

A cathode of the lithium secondary battery includes a cathode active material capable of reversibly intercalating and deintercalating lithium ions. As the cathode active material, for example, lithium composite oxides may be employed.

The lithium composite oxide may include, for example, metal elements such as nickel, cobalt, manganese, aluminum and the like.

As a field, to which the lithium secondary battery is applied, is expanded to large devices such as a hybrid vehicle, etc., research and development for a high nickel lithium composite oxide having an increased nickel content to secure a high capacity of lithium secondary batteries have been actively conducted.

For example, Korean Patent Registration Publication No. 10-0821523 discloses a method of manufacturing a cathode active material including a high nickel-based lithium composite oxide.

PRIOR ART DOCUMENT

Patent Document

Korean Patent Registration Publication No. 10-0821523

SUMMARY OF THE INVENTION

An object of the present invention is to provide a lithium secondary battery having improved life-span characteristics and high temperature storage performance.

Another object of the present invention is to provide a cathode active material which may implement improved life-span characteristics and high temperature storage performance, and a method of manufacturing the same.

To achieve the above objects, according to an aspect of the present invention, there is provided a cathode active material for a secondary battery, including: a lithium metal oxide particle having a form of a secondary particle in which a plurality of primary particles are agglomerated, wherein the primary particles include a particle having a triangular shape which has a size of a minimum internal angle of 45° or more and a maximum height of 0.5 μm or more.

In one embodiment, the lithium metal oxide particle may contain 80 mol % or more of nickel of all elements except for lithium and oxygen.

In one embodiment, the lithium metal oxide particle may be represented by Formula 1 below:

$$Li_xNi_aCo_bM_cO_z$$ [Formula 1]

(in Formula 1, M is at least one of Mg, Sr, Ba, B, Al, Si, Mn, Ti, Zr and W, and x, a, b, c and z are in a range of $0.9<x<1.2$, $0.8 \leq a \leq 0.98$, $0 \leq c/(a+b) \leq 0.25$, $0 \leq c \leq 0.2$, and $1.9 \leq z \leq 2.1$, respectively).

In one embodiment, the size of the minimum internal angle of the triangular shape may be 45° to 60°.

In one embodiment, the maximum height of the triangular shape may be 1 to 4 μm.

In one embodiment, the lithium metal oxide particle may have a particle size ($D_{50}$) of 3 to 20 μm.

In addition, according to another aspect of the present invention, there is provided a method of manufacturing a cathode active material for a secondary battery including: performing a co-precipitation reaction in a reaction solution including a metal salt, a chelating agent and a co-precipitating agent; and obtaining a metal hydroxide particle formed by the co-precipitation reaction.

The step of performing the co-precipitation reaction may include: a first co-precipitation reaction performed while maintaining a pH of the reaction solution and a concentration of the chelating agent in the reaction solution; a secondary co-precipitation reaction performed while decreasing the pH of the reaction solution and increasing the concentration of the chelating agent in the reaction solution; and a third co-precipitation reaction performed while maintaining the pH of the reaction solution and the concentration of the chelating agent in the reaction solution, and the first co-precipitation reaction to third co-precipitation reaction may be sequentially performed.

In one embodiment, the reaction solution may be prepared by mixing an aqueous solution containing the metal salt, and an aqueous solution containing the chelating agent and the co-precipitating agent.

In one embodiment, when a total reaction time of the co-precipitation reaction is 1 T, the reaction time of the secondary co-precipitation reaction may be 0.001 T to 0.02 T.

In one embodiment, in the second co-precipitation reaction, the pH of the reaction solution may be decreased by 0.7 to 2.5 from the pH in the first co-precipitation reaction, and the concentration of the chelating agent in the reaction solution may be increased to a numerical value of 1.2 to 2.5 times based on the concentration thereof in the first co-precipitation reaction.

In one embodiment, the metal hydroxide particle may have a form of a secondary particle in which a plurality of primary particles are aggregated, and the primary particles may include a particle having a triangualr shape, and when a total reaction time of the co-precipitation reaction is 1 T, the particle having the triangualr shape may be formed before a time of 0.6 T elapses from the start of the co-precipitation reaction.

In one embodiment, a maximum height of the triangular shape may be 0.5 μm or more.

In one embodiment, the metal salt may contain nickel.

In one embodiment, the metal salt may further contain at least one of Co, Mg, Sr, Ba, B, Al, Si, Mn, Ti, Zr and W.

In one embodiment, a molar ratio of nickel among all metals contained in the metal salt may be 0.8 or more.

In one embodiment, in the step of performing the co-precipitation reaction, a concentration of $Ni^{2+}$ in the reaction solution may be maintained at 50 to 100 ppm.

In one embodiment, during the third co-precipitation reaction, a solid content concentration in the reaction solution may be controlled to 30 to 55% by weight.

In one embodiment, the method of manufacturing a cathode active material for a secondary battery may further include: mixing the metal hydroxide particles and a lithium source; and calcining the mixture of the metal hydroxide particles and the lithium source to prepare a lithium metal oxide particle.

The lithium metal oxide particle may have a form of a secondary particle in which a plurality of primary particles are aggregated, wherein the primary particles may include a particle having a triangular shape which has a size of a minimum internal angle of 45° or more and a maximum height of 0.5 μm or more.

In one embodiment, the calcination may be performed in a temperature range of 670 to 785° C.

Further, according to another aspect of the present invention, there is provided a lithium secondary battery including: a cathode including the cathode active material according to the exemplary embodiments; and an anode disposed to face the cathode.

The cathode active material for a secondary battery according to exemplary embodiments may include a lithium metal oxide particle including a triangular-shaped primary particle having a predetermined size of a minimum internal angle or more and a predetermined maximum height or more, thereby having improved life-span characteristics and high temperature storage performance.

The lithium secondary battery according to the exemplary embodiments may include the cathode active material, thereby having the improved life-span characteristics and high temperature storage performance.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

As used herein, the term "lithium metal oxide" may refer to a compound which is an oxide capable of intercalating and deintercalating lithium ions, and includes lithium and a metal element.

As used herein, the term "primary particle" may refer to a single particle (monolith) which exists alone without forming an aggregate.

As used herein, the term "secondary particle" may refer to a particle having a form in which the primary particles are aggregated.

According to the present invention, there is provided a lithium metal oxide particle having a form of a secondary particle in which a plurality of primary particles are aggregated, wherein the primary particles include a particle having a triangular shape. The lithium metal oxide particle may be provided as a cathode active material for a lithium secondary battery. In addition, according to the present invention, there is provided a method of manufacturing the lithium metal oxide particle.

Cathode Active Material for a Lithium Secondary Battery

The cathode active material for a secondary battery according to exemplary embodiments may include a lithium metal oxide particle having a form of a secondary particle in which a plurality of primary particles are aggregated. The primary particles may include a particle having a triangular shape. A size of a minimum internal angle of the triangular shape may 45° or more and a maximum height of the triangular shape may 0.5 μm or more.

The lithium secondary battery according to exemplary embodiments may include the lithium metal oxide particles as a cathode active material, thereby having improved life-span characteristics (e.g., capacity retention rate at 25° C.) and high temperature storage performance (e.g., capacity retention rate at 45° C.)

In one embodiment, the primary particles may further include a triangular-shaped particle which has a size of a minimum internal angle of less than 45°, an amorphous particle, a needle-shaped particle, etc.

The particle having a triangular shape may refer to a primary particle in which a surface (i.e., a surface facing a viewer) to be observed has a triangular shape when observing the surface of the lithium metal oxide particle from the top. For example, when measuring the surface of the lithium metal oxide particle with a scanning electron microscope (SEM), if a shape of the surface of the primary particle measured in the SEM image (i.e., a two-dimensional image) is a triangular shape, the primary particle may be defined as a particle having a triangular shape.

In some embodiments, the triangular shape may have a shape in which vertices (corners) are curved. For example, a case in which three vertices are formed by imaginary extension sides formed by extending three sides within about 20% (based on a 100% length of respective sides) may also be included in the triangular shape.

For example, a side of the triangular shape may be a straight line or a curved line having a slight curvature as long as it can maintain the triangular shape.

The minimum internal angle of the triangular shape may refer to the smallest internal angle of the triangular shape. However, when all three angles are the same, the minimum internal angle may mean 60°.

In one embodiment, the size of the minimum internal angle of the triangular shape may be 45° or more and less than 60°.

In one embodiment, the size of the minimum internal angle of the triangular shape may be 45° to 60°. For example, it may include a case in which one internal angle of the triangular shape is 60° to have an equilateral triangle shape.

The maximum height of the triangular shape may refer to the longest height of the triangular shape. For example, the height of the triangle may mean a length of a perpendicular line when the perpendicular line is drawn down from one vertex to the opposite side, and three perpendicular lines may exist in the triangle. Among them, a length of the longest perpendicular line may refer to the maximum height.

In one embodiment, the maximum height of the triangular shape may be 0.5 μm or more, 1 μm or more, or 2 μm or more. Within the above range, life-span characteristics and high temperature storage performance of the secondary battery may be further improved.

In one embodiment, the maximum height of the triangular shape may be 6 μm or less, 5 μm or less, or 4 μm or less.

In some embodiments, the maximum height of the triangular shape may be 0.5 to 6 μm, 0.5 to 5 μm, 1 to 4 μm, 2 to 4 μm, or 3 to 4 μm.

In one embodiment, the lithium metal oxide particles (i.e., secondary particles) may have a particle size ($D_{50}$) of 3 to 20 μm.

For example, the particle size $D_{50}$ may be defined as a particle size at a point of 50% of a volume-based cumulative distribution. For example, the particle size $D_{50}$ may be measured by a laser diffraction method using a laser diffraction particle size measuring device (e.g., Microtrac, MT 3000).

In some embodiments, a length ratio of the maximum height of the triangular shape to the particle size ($D_{50}$) of the lithium metal oxide particles may be 0.025 to 1, 0.05 to 0.4, or 0.1 to 0.25.

In one embodiment, the lithium metal oxide particle may contain nickel (Ni).

In some embodiments, a content of nickel in the lithium metal oxide particle may be 80 mol % or more, 83 mol % or more, 88 mol % or more, or 93 mol % or more of all elements except for lithium and oxygen. Within the above range, it is possible to implement a secondary battery having a high capacity. In this regard, as the content of nickel in the lithium metal oxide particle is increased, chemical stability of the lithium oxide particle may be deteriorated. However, the lithium metal oxide particle according to the present invention may have improved chemical stability by including the primary particle having the above-described triangular shape.

In one embodiment, the lithium metal oxide particle may be represented by Formula 1 below.

$$Li_xNi_aCo_bM_cO_z \quad \text{[Formula 1]}$$

In Formula 1, M may be at least one of Mg, Sr, Ba, B, Al, Si, Mn, Ti, Zr and W, and x, a, b, c and z may be in a range of $0.9<x<1.2$, $0.8 \leq a \leq 0.98$, $0 \leq c/(a+b) \leq 0.25$, $0 \leq c \leq 0.2$, and $1.9 \leq z \leq 2.1$, respectively.

In some embodiments, a may be in a range of $0.83 \leq a \leq 0.98$, $0.85 \leq a \leq 0.98$, $0.88 \leq a \leq 0.98$, or $0.9 \leq a \leq 0.98$.

In some embodiments, the lithium metal oxide particle may further include a doping element. For example, the doping element may include Al, Ti, Ba, Zr, Si, B, Mg, Sr, W, La or the like. Structural stability of the lithium metal oxide particle may be improved by the doping element.

In one embodiment, the cathode active material may further include a coating layer on the surface of the lithium metal oxide particle. For example, the coating layer may include Al, Ti, Ba, Zr, Si, B, Mg, Sr, W, La or the like. In this case, life-span characteristics, high temperature stability, and the like of the secondary battery may be further improved.

Figure 2:
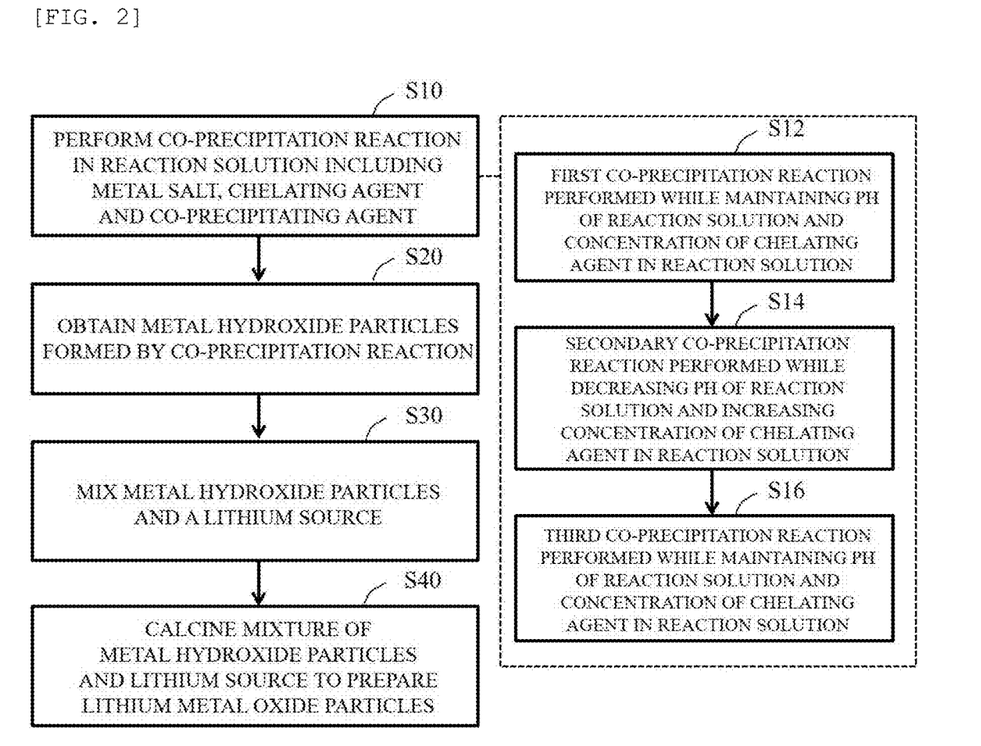
FIG. 2 is a flowchart schematically illustrating a method of manufacturing a cathode active material for a lithium secondary battery according to an exemplary embodiment of the present invention.

Method of Manufacturing a Cathode Active Material for a Lithium Secondary Battery FIG. 2 is a flowchart schematically illustrating a method of manufacturing a cathode active material for a lithium secondary battery according to exemplary embodiments.

Step of Preparing Metal Hydroxide Particles

The method of manufacturing a cathode active material for a secondary battery according to exemplary embodiments may include a step of preparing a metal hydroxide particle.

The step of preparing a metal hydroxide particle according to the exemplary embodiments may include a step of performing a co-precipitation reaction in a reaction solution including a metal salt, a chelating agent and a co-precipitating agent (e.g., S10); and a step of obtaining a metal hydroxide particle formed by the co-precipitation reaction (e.g., S20).

In one embodiment, the reaction solution may be prepared by inputting and mixing an aqueous solution of a metal salt in an aqueous solution containing a chelating agent and a co-precipitating agent.

For example, step S10 may include preparing an aqueous solution containing a chelating agent and a co-precipitating agent; and inputting an aqueous solution of a metal salt into the aqueous solution. For example, the pH of the aqueous solution may be 11.7 to 12.3. For example, the pH may be controlled using an aqueous NaOH solution.

In one embodiment, the step S10 may include a first co-precipitation reaction performed while maintaining a pH of the reaction solution and a concentration of the chelating agent in the reaction solution (e.g., S12); a secondary co-precipitation reaction performed while decreasing the pH of the reaction solution and increasing the concentration of the chelating agent in the reaction solution (e.g., S14); and a third co-precipitation reaction performed while maintaining the pH of the reaction solution and the concentration of the chelating agent in the reaction solution (e.g., S16). For example, the first to third co-precipitation reactions may be continuously and sequentially performed.

In one embodiment, the co-precipitation reaction may consist of the first to third co-precipitation reactions (e.g., S12, S14 and S16). For example, the co-precipitation reaction may start with the first co-precipitation reaction and end with the third co-precipitation reaction.

For example, maintaining the pH of the reaction solution may mean that a deviation in the pH during the reaction is maintained at 5% or less, and preferably 2.5% or less, based on an average pH in the reaction section.

For example, maintaining the concentration of the chelating agent in the reaction solution may mean that the deviation of the concentration of the chelating agent during the reaction is maintained at 10% or less, and preferably 7.5% or less, based on an average of the concentrations of the chelating agent in the reaction section.

In one embodiment, when a total reaction time of the co-precipitation reaction is defined as 1 T, the reaction time of the secondary co-precipitation reaction (e.g., S14) may be 0.001 T to 0.02 T. Preferably, the reaction time of the second co-precipitation reaction is 0.01 T to 0.02 T based on the total reaction time of the co-precipitation reaction 1 T. In the above range, it is possible to stably form a metal hydroxide particle including a triangular-shaped primary particle.

For example, the total reaction time (1T) of the co-precipitation reaction may mean a sum of the reaction times of the first to third co-precipitation reactions (e.g., the total reaction time of S12, S14 and S16). For example, the total reaction time (1T) of the co-precipitation reaction may mean a total time required from a time when the first co-precipitation reaction (e.g., S12) starts to a time when the third co-precipitation reaction (e.g., S16) ends.

For example, the time when the first co-precipitation reaction starts may be defined as a time when the inputting of the aqueous solution of a metal salt starts, and the time when the third co-precipitation reaction ends may be defined as a time when the inputting of the aqueous solution of a metal salt ends.

For example, an initial particle may be formed by the first co-precipitation reaction (e.g., S12), and the initial particle may be grown by the second co-precipitation reaction (e.g., S14) and the third co-precipitation reaction (e.g., S16)). For example, the initial particle may have a diameter of 1 to 2 μm.

In one embodiment, in step S14, the pH of the reaction solution may be decreased by 0.7 to 2.5 from the pH in step S12. For example, if the pH of the reaction solution in step S12 is A, the pH of the reaction solution in step S14 may be decreased to a value of A-0.7 to A-2.5. Preferably, in step S14, the pH of the reaction solution may be decreased by 1 to 2 from the pH in step S12.

In one embodiment, in step S14, the concentration of the chelating agent in the reaction solution may be increased to a numerical value of 1.2 to 2.5 times based on the concentration thereof in step S12. For example, if the concentration of the chelating agent in the reaction solution in step S12 is B, the concentration of the chelating agent in the reaction solution in step S14 may be increased to a value of 1.2 B to 2.5 B. Preferably, in step S14, the concentration of the chelating agent in the reaction solution may be increased to a value of 1.5 to 1.75 times based on the concentration thereof in step S12.

For example, in step S12, the co-precipitation reaction may be performed while maintaining the pH of the reaction solution at 11.5 to 12.5 and maintaining the concentration of the chelating agent in the reaction solution at 3 to 5 g/L. Alternatively, for example, the pH of the reaction solution may be maintained at 11.7 to 12.3, and the concentration of the chelating agent in the reaction solution may be maintained at 3.5 to 4.5 g/L.

For example, in step S14, the co-precipitation reaction may be performed while decreasing the pH of the reaction solution to 10.2 to 11.0, and increasing the concentration of the chelating agent in the reaction solution to 6 to 7 g/L. Alternatively, for example, the pH of the reaction solution may be decreased to 10.4 to 10.8.

For example, in step S16, the co-precipitation reaction may be performed while maintaining the pH of the reaction solution at 10.2 to 11.0 (i.e., the final numerical value decreased in step S14), and maintaining the concentration of the chelating agent in the reaction solution at 6 to 7 g/L (i.e., the final numerical value increased in step S14). Alternatively, for example, the pH of the reaction solution may be maintained at 10.4 to 10.8.

In one embodiment, the metal hydroxide particle may have a form of a secondary particle in which a plurality of primary particles are aggregated, and the primary particles may include a particle having a triangular shape.

In some embodiments, based on the total reaction time of the co-precipitation reaction (1T), the particle having the triangular shape may be formed before a time of 0.6 T elapses from the start of the co-precipitation reaction.

In one embodiment, the primary particles of the metal hydroxide particle may include a particle having a triangular shape which has a maximum height of 0.5 μm or more. For example, based on the total reaction time of the co-precipitation reaction of 1 T, before a time of 0.6 T elapses from the time when the co-precipitation reaction starts (e.g., from the time when the first co-precipitation reaction starts), the triangular shape at the time when the co-precipitation reaction ends (e.g., the time when the third co-precipitation reaction ends) from the start of forming the triangular-shaped particles may have a maximum height of 0.5 μm or more.

In some embodiments, the primary particles of the obtained metal hydroxide particle may include a particle having a triangular shape which has a maximum height of 1 μm or more, or 2 μm or more.

For example, if the particle having the triangular shape starts to form after the time of 0.6 T elapses from the start of the first co-precipitation reaction, it is difficult for the triangular shape to have the maximum height satisfying the above-described range after all the co-precipitation reactions end. For example, when the triangular-shaped particles after the co-precipitation reactions end do not have the maximum height satisfying the above-described range, the triangular shape may be collapsed during calcination of the metal hydroxide particles to be amorphous.

In one embodiment, the primary particles of the metal hydroxide particle may include a particle having a triangular shape which has a size of a minimum internal angle of 45° or more.

In one embodiment, the co-precipitating agent may include an alkaline compound such as sodium hydroxide, sodium carbonate and the like.

In one embodiment, the chelating agent may include ammonia water (e.g., $NH_3H_2O$), ammonium carbonate and the like.

In one embodiment, in step S16, the concentration of solid content in the reaction solution may be controlled to 30 to 55% by weight ('wt. %').

In one embodiment, the metal salt may include at least one of metal sulfate, metal nitrate, metal acetate, metal hydroxide, metal carbonate, and a hydrate thereof.

In one embodiment, the metal salt may include nickel (Ni).

In some embodiments, the metal salt may further include at least one of Co, Mg, Sr, Ba, B, Al, Si, Mn, Ti, Zr and W.

In some embodiments, a molar ratio of nickel among all metals included in the metal salt may be 0.8 or more.

In one embodiment, during performing the co-precipitation reaction (e.g., during performing steps S12, S14 and S16), the concentration of $Ni^{2+}$ in the reaction solution may be maintained at 50 to 100 ppm.

After the end of the co-precipitation reaction (e.g., after the end of step S16), the precipitate may be dried to obtain metal hydroxide particles. For example, the drying may be performed in a temperature range of 100 to 150° C.

In one embodiment, the metal hydroxide particles may have a particle size ($D_{50}$) of 3 μm to 20 μm.

Step of Preparing Lithium Metal Oxide Particles

In one embodiment, the method of manufacturing a cathode active material may include the step of preparing a lithium metal oxide particle from the metal hydroxide particle.

In some embodiments, the step of preparing the lithium metal oxide particle may include mixing the metal hydroxide particle and a lithium source (e.g., S30); and calcining the mixture of the metal hydroxide particle and the lithium source to prepare the lithium metal oxide particle (e.g., S40).

In one embodiment, the lithium metal oxide particle may have a form of a secondary particle in which a plurality of primary particles are aggregated, and the primary particles may include a particle having a triangular shape which has a size of a minimum internal angle of 45° or more and a maximum height of 0.5 μm or more.

In one embodiment, the lithium source may be a lithium salt. In some embodiments, the lithium salt may include lithium carbonate, lithium nitrate, lithium acetate, lithium oxide, lithium hydroxide and the like.

In one embodiment, in the step S40, the calcination may be performed in a temperature range of 670 to 785° C. In this case, it is possible to prevent the triangular-shaped primary particles from being collapsed to be amorphous.

For example, in the step S40, the calcined product may be cooled to room temperature, followed by grinding and classification to obtain the lithium metal oxide particle.

In one embodiment, the lithium metal oxide particles may have a particle size ($D_{50}$) of 3 μm to 20 μm.

The contents described above with respect to the lithium metal oxide particle may be applied to this step as they are, and therefore will not be described in detail.

In one embodiment, after the step S40, the method may further include doping the lithium metal oxide particle with a metal element and/or a metalloid element.

In one embodiment, after the step S40, the method may further include coating the surface of the lithium metal oxide particles with the metal element and/or the metalloid element.

For example, the metal element (or metalloid element) may include Al, Ti, Ba, Zr, Si, B, Mg, Sr, W, La or the like.

The doping and the coating may be performed by methods known in the art, and therefore will not be described in detail herein.

Lithium Secondary Battery

Figure 1:
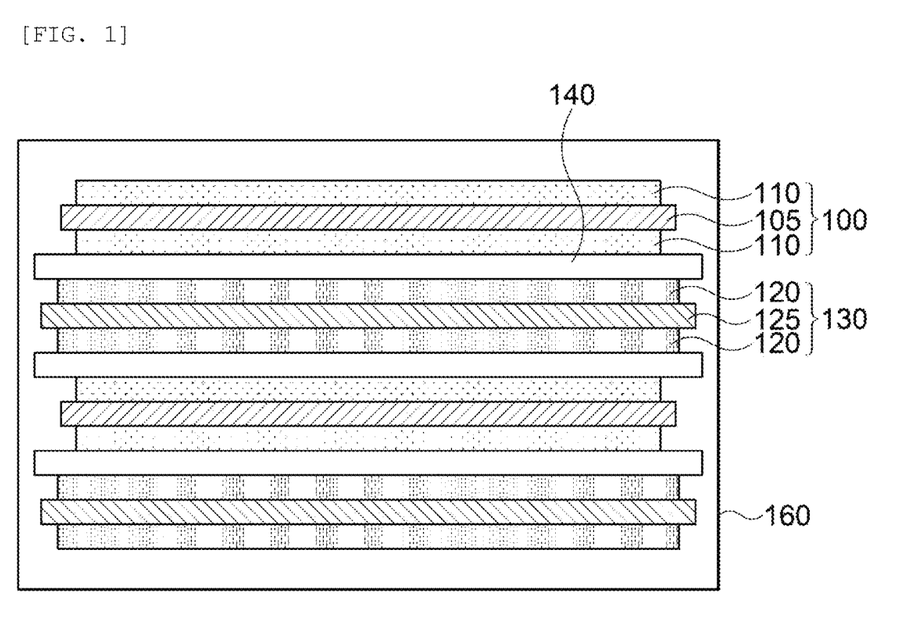
FIG. 1 is a schematic cross-sectional view illustrating a lithium secondary battery according to an embodiment of the present invention.

FIG. 1 is a cross-sectional view schematically illustrating a lithium secondary battery according to exemplary embodiments.

Referring to FIG. 1, the lithium secondary battery may include a cathode 100, an anode 130, and a separation membrane 140 interposed between the cathode and the anode.

The cathode 100 may include a cathode current collector 105 and a cathode active material layer 110 on the cathode current collector 105.

The cathode active material layer 110 may include a cathode active material, and if necessary, a cathode binder and a conductive material.

The cathode 100 may be prepared, for example, by mixing and stirring the cathode active material, the cathode binder, and the conductive material, etc. in the dispersion medium to prepare a cathode slurry, and then coating the cathode current collector 105 with the cathode slurry, followed by drying and rolling the same.

The cathode current collector 105 may include, for example, stainless steel, nickel, aluminum, titanium, copper, or an alloy thereof, and preferably, includes aluminum or an aluminum alloy.

The cathode active material may include the above-described cathode active material of the present invention.

The cathode binder may include, for example, an organic binder such as polyvinylidene fluoride (PVDF), vinylidene fluoride-hexafluoropropylene copolymer (PVDF-co-HFP), polyacrylonitrile, polymethyl methacrylate, etc., or an aqueous binder such as styrene-butadiene rubber (SBR). In addition, the cathode binder may be used together with a thickener such as carboxymethyl cellulose (CMC).

The conductive material may include, for example, a carbon-based conductive material such as graphite, carbon black, graphene, or carbon nanotubes and/or a metal-based conductive material such as tin, tin oxide, titanium oxide, or a perovskite material such as $LaSrCoO_3$, and $LaSrMnO_3$.

The anode 130 may include an anode current collector 125 and an anode active material layer 120 on the anode current collector 125.

The anode active material layer 120 may include an anode active material, and if necessary, an anode binder and a conductive material.

The anode 130 may be prepared, for example, by mixing and stirring the anode active material, the anode binder and the conductive material, etc. in a solvent to prepare an anode slurry, and then coating the anode current collector 125 with the anode slurry, followed by drying and rolling the same.

The anode current collector 125 may include, for example, gold, stainless steel, nickel, aluminum, titanium, copper or an alloy thereof, and preferably, includes copper or a copper alloy.

The anode active material may be a material capable of intercalating and deintercalating lithium ions. The anode active material may include, for example, a carbon-based material such as crystalline carbon, amorphous carbon, carbon composite material, or carbon fiber, etc.; a silicone-based material; a lithium alloy and the like.

The amorphous carbon may be, for example, hard carbon, cokes, mesocarbon microbead (MCMB) calcined at 1500° C. or lower, mesophase pitch-based carbon fiber (MPCF) or the like. The crystalline carbon may be, for example, natural graphite, graphite cokes, graphite MCMB, graphite MPCF or the like.

The silicon material may include, for example, Si, $SiO_x$ (0<x<2), Si/C, SiO/C, Si-metal or the like.

The lithium alloy may include, for example, a metal element such as aluminum, zinc, bismuth, cadmium, antimony, silicon, lead, tin, gallium, indium or the like.

The anode binder and the conductive material may be substantially the same as or similar to the above-described cathode binder and the conductive material. The anode binder may be, for example, an aqueous binder such as styrene-butadiene rubber (SBR) for consistency with the carbon-based active material, and may be used together with a thickener such as carboxymethyl cellulose (CMC).

The separation membrane 140 may be interposed between the cathode 100 and the anode 130. In some embodiments, the anode 130 may have an area (e.g., a contact area with the separation membrane 140) larger than that of the cathode 100. Thereby, lithium ions generated from the cathode 100 may smoothly move to the anode 130 without being precipitated in the middle.

The separation membrane 140 may include a porous polymer film made of a polyolefin polymer such as ethylene homopolymer, propylene homopolymer, ethylene/butene copolymer, ethylene/hexene copolymer, ethylene/methacrylate copolymer.

The separation membrane 140 may include a nonwoven fabric made of glass fiber having a high melting point, polyethylene terephthalate fiber or the like.

An electrode cell may be formed by including the cathode 100, the anode 130 and the separation membrane 140. In addition, a plurality of electrode cells may be laminated to form an electrode assembly 150. For example, the electrode assembly 150 may be formed by winding, lamination, z-folding, etc. the separation membrane 140.

The electrode assembly may be housed in a case 160 together with the electrolyte to form a lithium secondary battery.

The electrolyte may include, for example, a lithium salt, and the lithium salt may be housed in the case in a non-aqueous electrolyte state together with an organic solvent.

The lithium salt may be represented by, for example, $Li^+X^-$.

An anion (X−) of the lithium salt may be, for example, any one selected from $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, etc. In some embodiments, the lithium salt may include at least one of $LiBF_4$ and $LiPF_6$.

The organic solvent may include, for example, any one or more selected from ethylene carbonate (EC), propylene carbonate (PC), dimethyl carbonate (DMC), diethyl carbonate (DEC), ethylmethyl carbonate (EMC), methylpropyl carbonate, dipropyl carbonate, dimethyl sulfoxide, acetonitrile, dimethoxyethane, diethoxyethane, vinylene carbonate, sulforane, γ-butyrolactone, propylene sulfite, tetrahydrofurane and the like.

The lithium secondary battery may be manufactured, for example, in a cylindrical shape, a square shape, a pouch shape or a coin shape.

Hereinafter, preferred examples and comparative examples of the present invention will be described. However, the following examples are only preferred examples of the present invention, and the present invention is not limited thereto.

Example 1

(1) Preparation of Metal Hydroxide Particles 1.8 m³ of water was put into a batch reactor equipped with a stirrer and a concentrator and having a volume of 2 m³, and internal dissolved oxygen was removed by bubbling with nitrogen gas for 4 hours or more while maintaining an internal temperature at 60° C.

25 wt. % of aqueous NaOH solution and 28 wt. % of ammonia water were input into the reactor to prepare an aqueous solution having a pH of 12.0 and a concentration of $NH_3$ of 4 g/L.

While the aqueous solution in the reactor was stirred at a speed of 300 rpm, 2.0 M aqueous metal sulfate solution (molar ratio of Ni:Co:Mn=88:9:3), 25 wt. % aqueous NaOH solution, and 28 wt. % ammonia water were input into the reactor while bubbling with $N_2$ to prepare a reaction solution.

While the pH of the reaction solution was maintained at 11.9 to 12.1, and the concentration of $NH_3$ was maintained at 4 g/L, a first co-precipitation reaction was performed for 2 hours to form initial particles.

Thereafter, the stirring speed of the reaction solution was reduced to 240 rpm, then a second co-precipitation reaction was performed while controlling input amounts of aqueous NaOH solution and $NH_3$.

More specifically, the pH of the reaction solution was decreased to 10.4 to 10.8, and the concentration of $NH_3$ in the reaction solution was increased to 6 to 7 g/L, then a secondary co-precipitation reaction was performed to grow initial particles. When the total reaction time of the co-precipitation reaction (320 hours) was 1 T, the second co-precipitation reaction was performed for about 0.019 T (6 hours) time.

Next, while the pH of the reaction solution (10.4 to 10.8) and the concentration of $NH_3$ in the reaction solution (6 to 7 g/L) were maintained until the end of the co-precipitation reaction, a third co-precipitation reaction was performed.

During the co-precipitation reaction, the aqueous solution of a metal salt was continuously input into the reactor, a filtrate was continuously discharged to an outside of the reactor by the concentrator equipped in the reactor, and the reaction was performed for 320 hours while the formed solid content remained in the reactor.

The stirring speed was gradually decreased to 120 rpm until the end of the co-precipitation reaction, and the pH of the reaction solution and the concentration of $NH_3$ in the reaction solution were maintained in the above-described range. In addition, the concentration of $Ni^{2+}$ in the reaction solution was maintained at 50 to 100 ppm.

During the co-precipitation reaction, in order to maintain the concentration of the solid content in the reaction solution at 30 to 55 wt. %, the reaction solution was branched once at a time of 240 hours elapses from the start of the co-precipitation reaction.

After the co-precipitation reaction ends, the concentration of solid content in the reactor was confirmed to be 53 wt. %. The reaction solution, which has ended the co-precipitation, was sequentially washed with 12.5 wt. % aqueous NaOH solution and pure water, followed by filtering the same.

The filtrate was dried at 130° C. for 12 hours to obtain metal hydroxide particles $Ni_{0.88}Co_{0.09}Mn_{0.03}(OH)_2$ having a particle size ($D_{50}$) of about 11.0 μm.

It was confirmed that, when the total reaction time of the co-precipitation reaction (320 hours) was defined as 1 T, triangular-shaped primary particles were formed at a time of 170 hours elapses corresponding to 0.53 T.

Figure 6A:
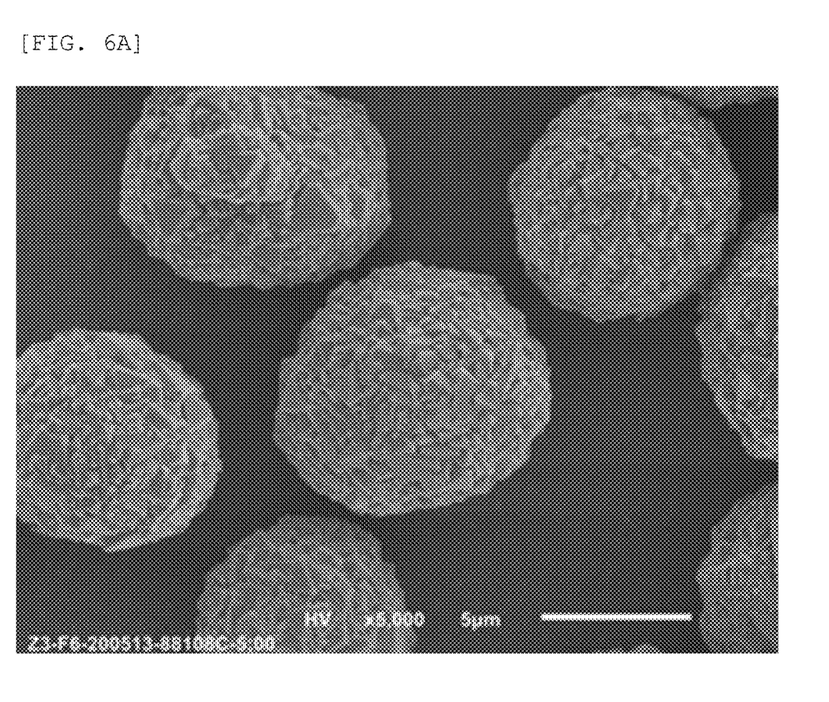
FIGS. 6A and 6B are scanning electron microscope (SEM) images taken on surfaces of metal hydroxide particles of Example 1 and Comparative Example 3, respectively, which are photographed at a time of 0.55 T elapses (total reaction time co-precipitation reaction: 1T) from the start of the co-precipitation reaction.

FIG. 6A is a scanning electron microscope (SEM) image of the surface of the metal hydroxide particles taken at a time when 0.55 T elapses from the start of the co-precipitation reaction. Referring to FIG. 6A, it can be confirmed that the triangular-shaped primary particles are observed on the surface of the metal hydroxide particles.

(2) Preparation of Lithium Metal Oxide Particles 10 kg of the metal hydroxide particles and lithium hydroxide (LiOH·H₂O) were input into a high-speed mixer in a Li/M molar ratio of 1.01, and then mixed.

The prepared mixture was put in a ceramic crucible and input into a calcination furnace (Noritake, RHK Simulator), then the mixture was heated to 730° C. at a heating rate of 2.5° C./min, and maintained at 730° C. for 10 hours. Oxygen was continuously passed at a flow rate of 40 mL/min during heating and maintaining the temperature.

After the end of the calcination, the calcined product was naturally cooled to room temperature, followed by grinding and classification to obtain lithium metal oxide particles $LiNi_{0.88}Co_{0.09}Mn_{0.03}O_2$ having a particle size ($D_{50}$) of about 11.0 μm.

Example 2

Lithium metal oxide particles $LiNi_{0.88}Co_{0.09}Mn_{0.03}O_2$ having a particle size ($D_{50}$) of about 11.1 μm was obtained by performing the same procedures as described in Example 1, except that the calcination temperature was changed to 740° C. when preparing the lithium metal oxide particles.

Example 3

Lithium metal oxide particles $LiNi_{0.88}Co_{0.09}Mn_{0.03}O_2$ having a particle size ($D_{50}$) of about 11.3 μm was obtained by performing the same procedures as described in Example 1, except that the calcination temperature was changed to 750° C. when preparing the lithium metal oxide particles.

Comparative Example 1

(1) Preparation of Metal Hydroxide Particles 1.8 m³ of water was put into a batch reactor equipped with a stirrer and a concentrator and having a volume of 2 m³, and internal dissolved oxygen was removed by bubbling with nitrogen gas for 4 hours or more while maintaining an internal temperature at 55° C. 25 wt. % of aqueous NaOH solution and 28 wt. % of ammonia water were input into the reactor to prepare an aqueous solution having a pH of 12.1 and a concentration of $NH_3$ of 27 g/L.

While the aqueous solution in the reactor was stirred at a speed of 300 rpm, 2.0 M aqueous metal sulfate solution (molar ratio of Ni:Co:Mn=88:9:3), 25 wt. % aqueous NaOH solution, and 28 wt. % ammonia water were input into the reactor while bubbling with $N_2$ to prepare a reaction solution.

While the pH of the reaction solution was maintained at 11.9 to 12.1, and the concentration of $NH_3$ was maintained at 24 g/L, a reaction for forming initial particles was performed for 2 hours.

Thereafter, the stirring speed of the reaction solution was reduced to 240 rpm, then a co-precipitation reaction was performed. The stirring speed of the reaction solution was gradually decreased to 200 rpm until the end of the co-precipitation reaction. In addition, the pH of the reaction solution was gradually decreased and maintained to 11.4. Further, the concentration of $Ni^{2+}$ in the reaction solution was maintained at 50 to 100 ppm, and the concentration of ammonia was maintained at 24 to 27 g/L.

During the reaction, the filtrate was continuously discharged to the outside of the reactor by the concentrator equipped in the reactor, and the reaction was continued for 65 hours while the formed solid content remained in the reactor.

After the co-precipitation reaction ends, the concentration of the solid content in the reactor was confirmed to be 27 wt. %. The reaction solution, which has ended the co-precipitation, was sequentially washed with 12.5 wt. % aqueous NaOH solution and pure water, filtered, and dried at 130° C. for 12 hours to obtain metal hydroxide particles $Ni_{0.88}Co_{0.09}Mn_{0.03}(OH)_2$ having a particle size (D50) of about 17 μm.

(2) Preparation of Lithium Metal Oxide Particles 10 kg of the metal hydroxide particles and lithium hydroxide ($LiOH \cdot H_2O$) were input into a high-speed mixer in a Li/M molar ratio of 1.01, and then mixed.

The prepared mixture was put in a ceramic crucible and input into a calcination furnace (Noritake, RHK Simulator), then the mixture was heated to 730° C. at a heating rate of 2.5° C./min, and maintained at 730° C. for 10 hours. Oxygen was continuously passed at a flow rate of 40 mL/min during heating and maintaining the temperature.

After the end of the calcination, the calcined product was naturally cooled to room temperature, followed by grinding and classification to obtain lithium metal oxide particles $LiNi_{0.88}Co_{0.09}Mn_{0.03}O_2$ having a particle size ($D_{50}$) of about 17 μm.

Comparative Example 2

(1) Preparation of Metal Hydroxide Particles

An aqueous solution of a metal salt, in which $NiSO_4$, $COSO_4$ and $MnSO_4$ were mixed in a molar ratio of 88:9:3, respectively, using distilled water from which dissolved oxygen was removed by bubbling with nitrogen gas ($N_2$) for 24 hours.

The aqueous solution of a metal salt was input into a continuous stirred-tank reactor (CSTR) at 50° C. having a volume of 2 m³, and a co-precipitation reaction was continuously performed using NaOH and $NH_3H_2O$ as a precipitating agent and a chelating agent.

After 50 hours elapses from the start of the co-precipitation reaction, the reaction solution continuously overflowed from the reactor was received in the receiver for 10 hours.

The obtained reaction solution was sequentially washed with 12.5 wt. % aqueous NaOH solution and pure water, filtered, and dried at 130° C. for 12 hours to obtain metal hydroxide particles $Ni_{0.88}Co_{0.09}Mn_{0.03}(OH)_2$ having a particle size ($D_{50}$) of about 11 μm.

(2) Preparation of Lithium Metal Oxide 10 kg of the metal hydroxide particles and lithium hydroxide ($LiOH \cdot H_2O$) were input into a high-speed mixer in a Li/M molar ratio of 1.01, and then mixed.

The prepared mixture was input into a calcination furnace (Noritake, RHK Simulator), then the mixture was heated to 730° C. at a heating rate of 2° C./min, and maintained at 730° C. for 10 hours. Oxygen was continuously passed at a flow rate of 10 mL/min during heating and maintaining the temperature.

After the end of the calcination, the calcined product was naturally cooled to room temperature, followed by grinding and classification to obtain lithium metal oxide particles ($LiNi_{0.8}Co_{0.1}Mn_{0.1}O_2$) having a particle size ($D_{50}$) of about 11.0 μm.

Comparative Example 3

(1) Preparation of Metal Hydroxide Particles 1.8 m³ of water was put into a batch reactor equipped with a stirrer and a concentrator and having a volume of 2 m³, and internal dissolved oxygen was removed by bubbling with nitrogen gas for 4 hours or more while maintaining an internal temperature at 60° C.

25 wt. % of aqueous NaOH solution and 28 wt. % of ammonia water were input into the reactor to prepare an aqueous solution having a pH of 12.0 and a concentration of $NH_3$ of 4 g/L.

While the aqueous solution in the reactor was stirred at a speed of 300 rpm, 2.0 M aqueous metal sulfate solution (molar ratio of Ni:Co:Mn=88:9:3), 25 wt. % aqueous NaOH solution, and 28 wt. % ammonia water were input into the reactor while bubbling with $N_2$ to prepare a reaction solution.

While the pH of the reaction solution was maintained at 11.9 to 12.1, and the concentration of $NH_3$ was maintained at 4 g/L, a first co-precipitation reaction was performed for 2 hours to form initial particles.

Then, the stirring speed of the reaction solution was reduced to 240 rpm, then input amounts of aqueous NaOH solution and $NH_3$ were controlled.

More specifically, the pH of the reaction solution was gradually decreased to 10.8 and the concentration of $NH_3$ in the reaction solution was gradually increased to 6 g/L until the end of the co-precipitation reaction, and a secondary co-precipitation reaction was performed to grow the initial particles.

In addition, the stirring speed of the reaction solution was gradually decreased to 120 rpm until the end of the co-precipitation reaction, and the concentration of $Ni^{2+}$ in the reaction solution was maintained at 50 to 100 ppm.

During the co-precipitation reaction, the aqueous solution of a metal salt was continuously input into the reactor, a filtrate was continuously discharged to an outside of the reactor by the concentrator equipped in the reactor, and the reaction was performed for 320 hours while the formed solid content remained in the reactor.

During the co-precipitation reaction, in order to maintain the concentration of the solid content in the reaction solution at 30 to 55 wt. %, the reaction solution was branched once at a time of 250 hours elapses from the start of the co-precipitation reaction.

After the co-precipitation reaction ends, the concentration of the solid content in the reactor was confirmed to be 51 wt. %. The reaction solution, which has ended the co-precipitation, was sequentially washed with 12.5 wt. % aqueous NaOH solution and pure water, filtered, and dried at 130° C. for 12 hours to obtain metal hydroxide particles $Ni_{0.88}Co_{0.09}Mn_{0.03}(OH)_2$ having a particle size (D50) of about 11.0 μm.

It was confirmed that, when the total reaction time of the co-precipitation reaction (300 hours) was defined as 1 T, triangular-shaped primary particles were formed at a time of 210 hours elapses corresponding to 0.7 T.

Figure 6B:
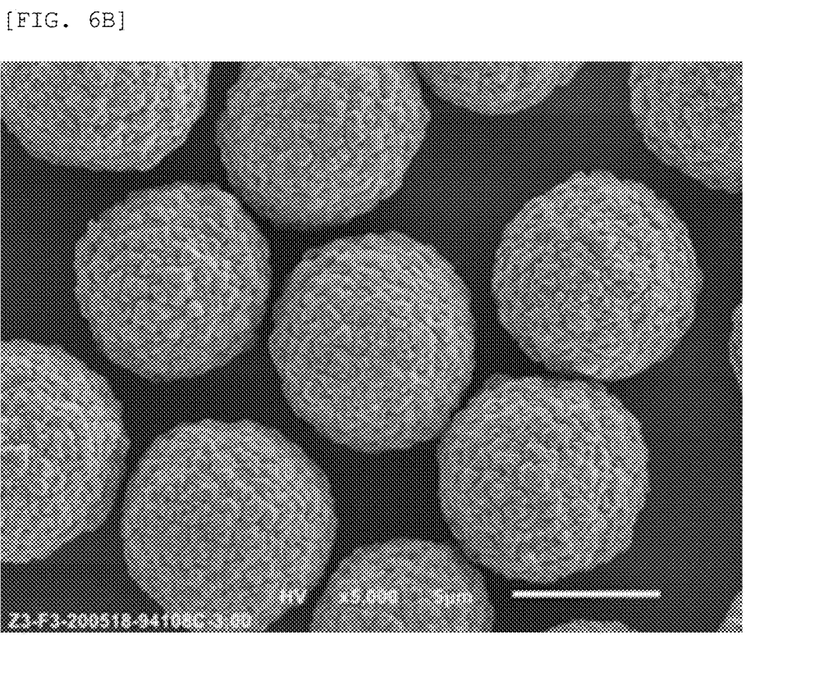

FIG. 6B is a scanning electron microscope (SEM) image of the surface of the metal hydroxide particles taken at a time when 0.55 T elapses from the start of the co-precipitation reaction. Referring to FIG. 6B, it can be seen that triangular-shaped primary particles are not observed on the surface of the metal hydroxide particles.

(2) Preparation of Lithium Metal Oxide 10 kg of the metal hydroxide particles and lithium hydroxide (LiOH·H$_2$O) were input into a high-speed mixer in a Li/M molar ratio of 1.01, and then mixed.

The prepared mixture was put in a ceramic crucible and input into a calcination furnace (Noritake, RHK Simulator), then the mixture was heated to 730° C. at a heating rate of 2.5° C./min, and maintained at 730° C. for 10 hours. Oxygen was continuously passed at a flow rate of 40 mL/min during heating and maintaining the temperature.

After the end of the calcination, the calcined product was naturally cooled to room temperature, followed by grinding and classification to obtain lithium metal oxide particles $LiNi_{0.88}Co_{0.09}Mn_{0.03}O_2$ having a particle size ($D_{50}$) of about 11.0 μm.

Experimental Example 1: Analysis of Surface Structure (1) Observation of Primary Particle Shape in Metal Hydroxide Particles and Lithium Metal Oxide Particles Surface SEM images of the metal hydroxide particles of Example 1 and Comparative Examples 1 to 3; and surface SEM images of the lithium metal oxide particles of Examples 1 to 3 and Comparative Examples 1 to 3 were obtained using a scanning electron microscope (SEM).

FIG. 3A to 3D are scanning electron microscope (SEM) images taken on the surfaces of the metal hydroxide particles of Example 1 and Comparative Examples 1 to 3, respectively. FIG. 4A to FIG. 4D are scanning electron microscope (SEM) images taken on the surfaces of lithium metal oxide particles of Examples 1 to 3 and Comparative Example 3, respectively. FIGS. 5A and 5B are scanning electron microscope (SEM) images taken on the surfaces of lithium metal oxide particles of Comparative Examples 1 and 2, respectively.

Figure 3A:
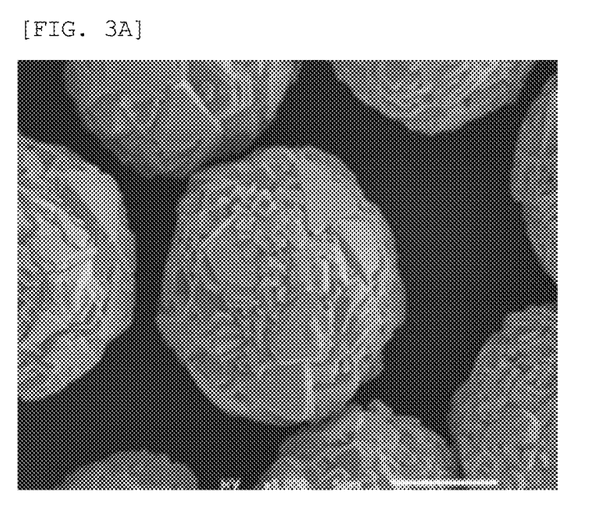
FIG. 3A to 3D are scanning electron microscope (SEM) images taken on surfaces of the metal hydroxide particles of Example 1 and Comparative Examples 1 to 3, respectively.
Figure 3B:
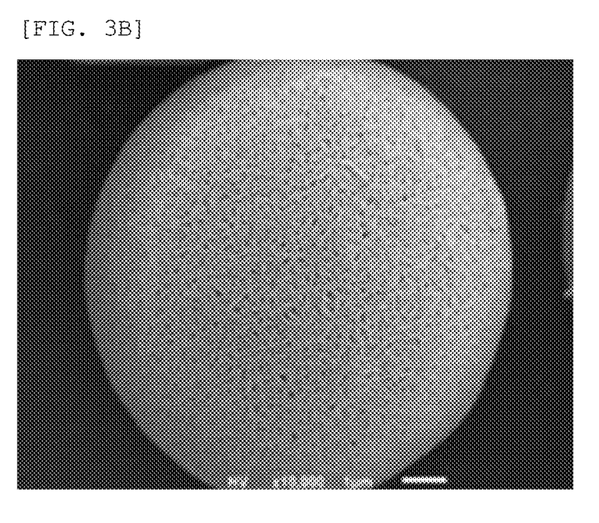
Figure 3C:
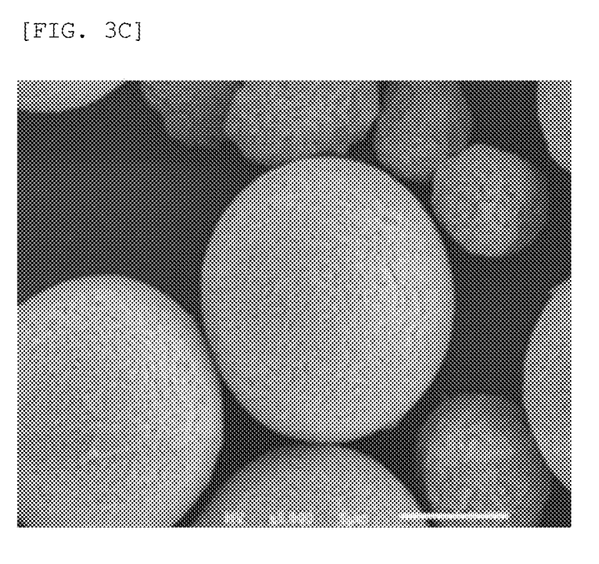
Figure 3D:
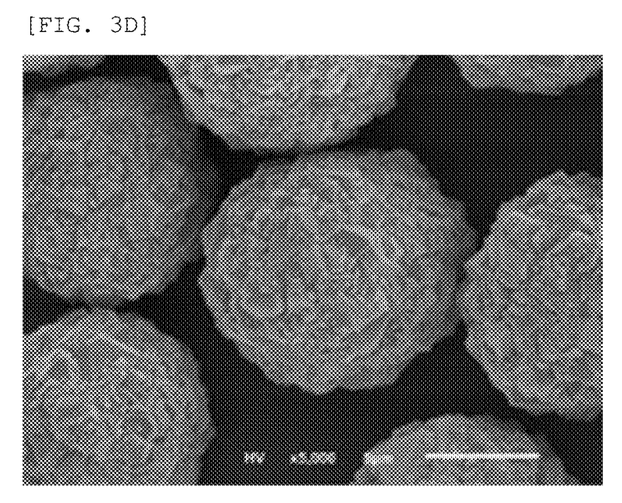

Referring to FIGS. 3A and 3D, it can be seen that triangular-shaped primary particles are observed on the surfaces of the metal hydroxide particles of Example 1 and Comparative Example 3. On the other hand, Referring to FIGS. 3B and 3C, it can be seen that needle-shaped primary particles are observed on the surfaces of the metal hydroxide particles of Comparative Examples 1 and 2.

Figure 4A:
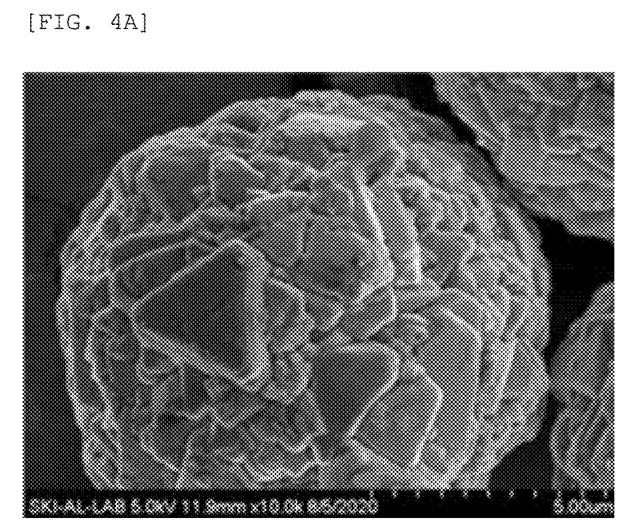
FIG. 4A to 4D are scanning electron microscope (SEM) images taken on surfaces of lithium metal oxide particles of Examples 1 to 3 and Comparative Example 3, respectively.
Figure 4B:
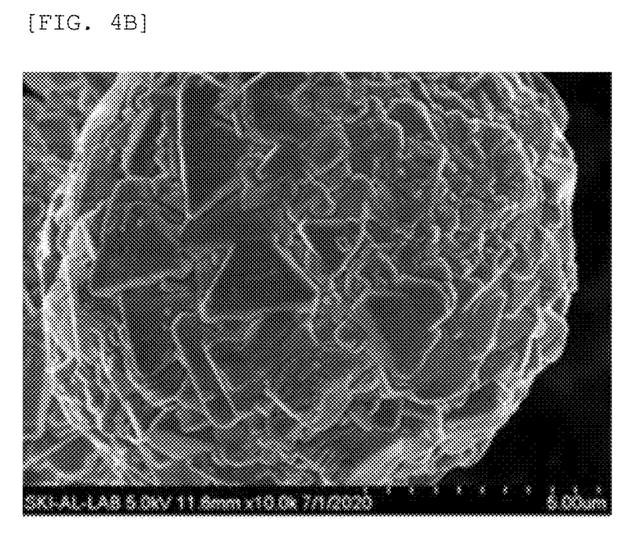
Figure 4C:
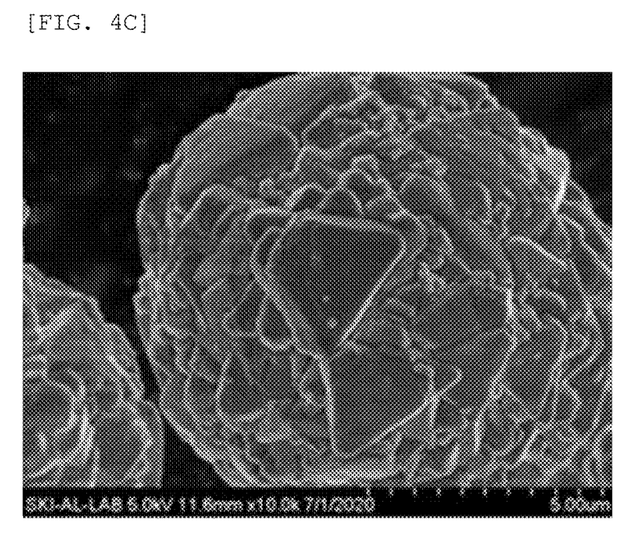
Figure 4D:
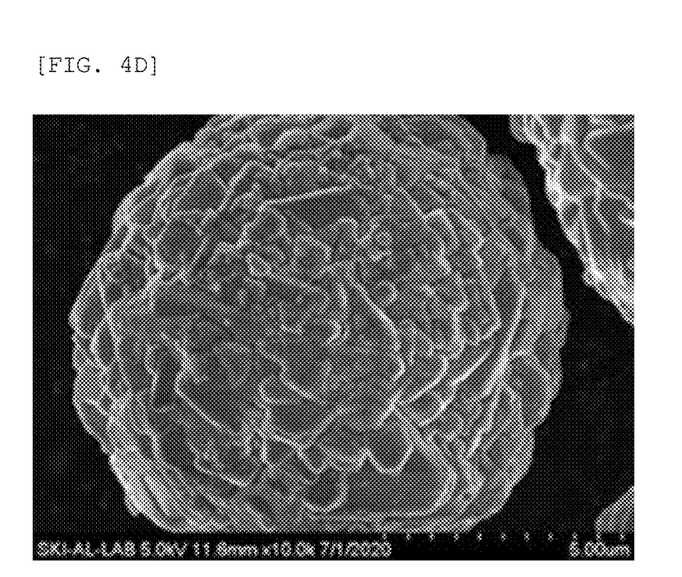
Figure 5A:
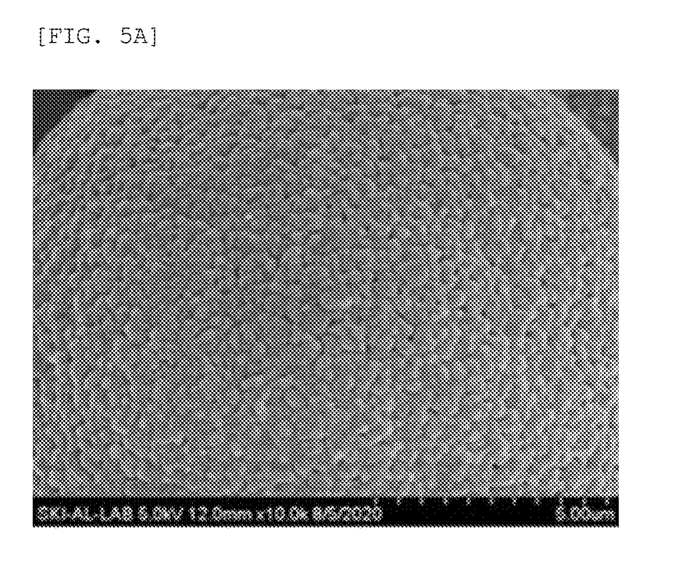
FIGS. 5A and 5B are scanning electron microscope (SEM) images taken on surfaces of lithium metal oxide particles of Comparative Examples 1 and 2, respectively.
Figure 5B:
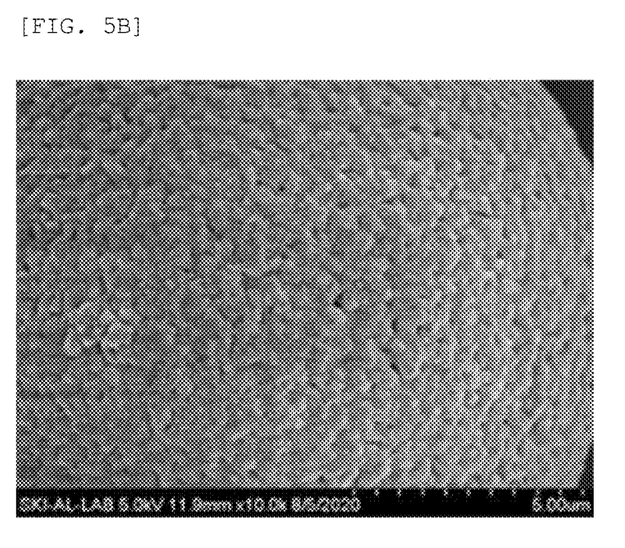

Referring to FIGS. 4A to 4C, it can be seen that the triangular-shaped primary particles were observed on the surfaces of lithium metal oxide particles of the examples. That is, the triangular-shaped primary particles, which have been observed in the metal oxide particles, were well maintained in the lithium metal oxide particles of the examples even after the calcination. On the other hand, Referring to FIG. 4D, it can be confirmed that the triangular shape was collapsed in the lithium metal oxide particles of Comparative Example 3 to be amorphous.

(2) Evaluation of Triangular-Shaped Primary Particles of Lithium Metal Oxide Particles.

The lithium metal oxide particles of the examples and comparative examples were measured with a scanning electron microscope (SEM). Maximum heights and minimum internal angles of the triangular shape were measured using the obtained SEM images.

1) Maximum Height

A length of a perpendicular line when the perpendicular line is drawn down from one vertex to the opposite side was defined as a height. The lengths of the perpendicular lines were measured with respect to each vertex and opposite side, and the longest length of the measured lengths of the perpendicular lines was defined as the maximum height. The measured maximum heights are described in Table 1 below.

2) Minimum Internal Angle

The smallest internal angles of the triangle were measured and described in Table 1 below.

Experimental Example 2: Manufacturing and Evaluation of Coin Cell

Slurries were prepared by mixing the lithium metal oxides of the examples and comparative examples, carbon black as a conductive material, and polyvinylidene fluoride (PVDF) as a binder in a weight ratio of 92:5:3.

The prepared slurry was applied to an aluminum thin film having a thickness of 15 μm, and is vacuum-dried at 130° C. to prepare a cathode. Then, an electrode assembly was formed using the cathode, a lithium foil as a counter electrode, and a porous polyethylene membrane having a thickness of 21 μm as a separation membrane.

Using the electrode assembly and LiPF$_6$ electrolyte of 1.0 M (a solvent in which ethylene carbonate and ethylmethyl carbonate are mixed in a volume ratio of 3:7), a secondary battery having a coin half-cell shape was manufactured according to the conventionally known manufacturing process.

(1) Measurement of Initial Charge Capacity and Initial Discharge Capacity

For the secondary batteries of the examples and comparative examples, CC/CV charge (0.1 C 4.3 V 0.05 C CUT-OFF) and CC discharge (0.1 C 3.0 V CUT-OFF) were performed once to measure initial charging and discharging capacities, and results thereof are described in Table 2 below.

(2) Measurement of Initial Efficiency

The initial efficiency was measured by a percentage value obtained by dividing the initial discharge amount measured according to the above (1) by the initial charge amount.

Initial efficiency =

(Initial discharge capacity/Initial charge capacity) × 100 (%)

(3) Measurement of Life-Span Characteristics at Room Temperature (Room Temperature Capacity Retention Rate)

For the secondary batteries of the examples and comparative examples, CC/CV charge (0.5 C 4.3 V 0.05 C CUT-OFF) and CC discharge (1.0 C 3.0 V CUT-OFF) were repeatedly performed 300 times at room temperature (25° C.).

The room temperature capacity retention rate was calculated by a percentage of value obtained by dividing the discharge capacity measured at the 300th time by the initial discharge capacity measured in the above (1).

Room temperature capacity retention rate = (300th discharge capacity/Initial discharge capacity) × 100 (%)

The calculated room temperature capacity retention rates are described n in Table 2 below.

(4) Evaluation of High Temperature Storage Performance (High Temperature Capacity Retention Rate)

For the secondary batteries of the examples and comparative examples, CC/CV charge (0.33 C 4.3 V 0.05 C CUT-OFF) and CC discharge (0.33 C 3.0 V CUT-OFF) were repeatedly performed 100 times at high temperature (45° C.).

The high temperature capacity retention rate was calculated by a percentage of the value obtained by dividing the discharge capacity measured at the 100th time by the initial discharge capacity measured in the above (1).

High temperature capacity retention rate = (100th discharge capacity/Initial discharge capacity) × 100 (%)

The calculated high temperature capacity retention rates are described in Table 2 below.

TABLE 1

| | Metal hydroxide particle | | | Lithium metal oxide particle | | | | |
| --- | --- | --- | --- | --- | --- | --- | --- | --- |
| | Presence or absence of triangular-shaped primary particle | Maximum height of triangular shape (μm) | Minimum internal angle of triangular shape (°) | Calcination temperature (° C.) | Particle size (μm) | Presence or absence of triangular-shaped primary particle | Maximum height of triangular shape (μm) | Minimum internal angle of triangular shape (°) |
| Example 1 | o | 3.9 | 52 | 730 | 11.0 | o | 3.8 | 52 |
| Example 2 | o | 3.9 | 52 | 740 | 11.1 | o | 3.7 | 53 |
| Example 3 | o | 3.9 | 52 | 750 | 11.3 | o | 3.9 | 52 |
| Comparative Example 1 | x | — | — | 730 | 17.0 | x | — | — |
| Comparative Example 2 | x | — | — | 730 | 11.0 | x | — | — |
| Comparative Example 3 | o | 2.6 | 56 | 730 | 10.9 | x | — | — |

TABLE 2

|  | Initial charge capacity (mah/g) | Initial discharge capacity (mah/g) | Efficiency (%) | Room temperature capacity retention rate (%) | High temperature capacity retention rate (%) |
| --- | --- | --- | --- | --- | --- |
| Example 1 | 238 | 215 | 90.3 | 70 | 87 |
| Example 2 | 237 | 213 | 90.0 | 68 | 83 |
| Example 3 | 236 | 212 | 89.8 | 66 | 84 |
| Comparative Example 1 | 236 | 216 | 91.5 | 65 | 71 |
| Comparative Example 2 | 236 | 215 | 91.2 | 64 | 72 |
| Comparative Example 3 | 237 | 214 | 90.2 | 67 | 81 |

Referring to Tables 1 and 2 above, it can be seen that the secondary batteries of the examples exhibit improved room temperature capacity retention rate and high temperature capacity retention rate.

The secondary batteries of Comparative Examples 1 and 2 did not include the triangular-shaped primary particles, but used the lithium metal oxide particles including needle-shaped primary particles as the cathode active material. The secondary batteries of Comparative Examples 1 and 2 exhibited an inferior value of about 10% in the room temperature capacity retention rate and an inferior value of about 20% in the high temperature capacity retention rate compared to the examples.

The secondary battery of Comparative Example 3 used the lithium metal oxide particles including amorphous primary particles, in which the triangular shape was collapsed during calcination, as the cathode active material. The secondary battery of Comparative Example 3 exhibited inferior room temperature capacity retention rate and high temperature capacity retention rate compared to the examples.

What is claimed is:

1. A cathode active material for a secondary battery, comprising:
    a lithium metal oxide particle having a form of a secondary particle in which a plurality of primary particles are agglomerated,
    wherein the primary particles comprise a particle having a triangular shape which has a size of a minimum internal angle of 45° or more and a maximum height ranging from 0.5 μm to 6 μm.

2. The cathode active material for a secondary battery according to claim 1, wherein the lithium metal oxide particle contains 80 mol % or more of nickel of all elements except for lithium and oxygen.

3. The cathode active material for a secondary battery according to claim 1, wherein the lithium metal oxide particle is represented by Formula 1 below:

$Li_xNi_aCo_bM_cO_z$ [Formula 1]

(in Formula 1, M is at least one of Mg, Sr, Ba, B, Al, Si, Mn, Ti, Zr and W, and x, a, b, c and z are in a range of $0.9<x<1.2$, $0.8 \leq a \leq 0.98$, $0 \leq c/(a+b) \leq 0.25$, $0 \leq c \leq 0.2$, and $1.9 \leq z \leq 2.1$, respectively).

4. The cathode active material for a secondary battery according to claim 1, wherein the size of the minimum internal angle of the triangular shape is 45° to 60°.

5. The cathode active material for a secondary battery according to claim 1, wherein the maximum height of the triangular shape is 1 to 4 μm.

6. The cathode active material for a secondary battery according to claim 1, wherein the lithium metal oxide particle has a particle size ($D_{50}$) of 3 to 20 μm.

7. A lithium secondary battery comprising:
    a cathode comprising the cathode active material according to claim 1; and
    an anode disposed to face the cathode.

* * * * *